United States Patent
Ma et al.

(10) Patent No.: US 7,348,740 B2
(45) Date of Patent: Mar. 25, 2008

(54) MOTOR CONTROL CIRCUIT FOR FORWARD/REVERSE ROTATION

(75) Inventors: Ching-Cheng Ma, Chaozhou (TW); Hsin-mao Hsieh, Pingtung (TW)

(73) Assignee: Adda Corporation, Pingtung (TW)

( * ) Notice: Subject to any disclaimer, the term of this patent is extended or adjusted under 35 U.S.C. 154(b) by 20 days.

(21) Appl. No.: 11/500,930

(22) Filed: Aug. 9, 2006

(65) Prior Publication Data

US 2008/0036405 A1    Feb. 14, 2008

(51) Int. Cl.
*H02P 6/08* (2006.01)
*H02P 6/02* (2006.01)

(52) U.S. Cl. .................. 318/254; 318/138; 318/293; 318/439

(58) Field of Classification Search ............ 318/139, 318/245, 254, 439, 560, 561, 138, 293; 363/41
See application file for complete search history.

(56) References Cited

U.S. PATENT DOCUMENTS

| | | | | |
|---|---|---|---|---|
| 3,242,406 A * | 3/1966 | Tanaka | ............ | 318/138 |
| 4,412,159 A * | 10/1983 | Uzuka | ............ | 318/254 |
| 4,701,683 A * | 10/1987 | Kikkawa | ............ | 318/254 |
| 5,041,774 A * | 8/1991 | Komatsu | ............ | 318/727 |
| 5,099,181 A * | 3/1992 | Canon | ............ | 318/254 |
| 5,289,089 A * | 2/1994 | Aoki | ............ | 318/254 |
| 5,923,110 A * | 7/1999 | Zhao et al. | ............ | 310/91 |
| 5,945,795 A * | 8/1999 | Lee | ............ | 318/254 |
| 6,219,260 B1 * | 4/2001 | Gotoh et al. | ............ | 363/41 |
| 6,995,531 B2 * | 2/2006 | Ichimaru et al. | ............ | 318/254 |
| 7,019,473 B2 * | 3/2006 | Yang et al. | ............ | 318/254 |
| 7,064,518 B1 * | 6/2006 | Hsieh | ............ | 318/802 |
| 2004/0227475 A1 * | 11/2004 | Yang et al. | ............ | 318/254 |
| 2005/0218844 A1 * | 10/2005 | Ichimaru et al. | ............ | 318/254 |
| 2007/0138994 A1 * | 6/2007 | Hsieh | ............ | 318/800 |

* cited by examiner

*Primary Examiner*—Paul Ip
(74) *Attorney, Agent, or Firm*—Troxell Law Office, PLLC

(57) ABSTRACT

A motor control circuit for forward/reverse rotation comprises a driving circuit, a switching circuit and a motor coil winding. The driving circuit has a driving source, a Hall IC and a driving IC. The driving source provides a signal to enable the Hall IC to output a control signal to the driving IC and the driving IC generates a driving signal after receiving the control signal. The switching circuit is applied for changing the transmitting direction of the control signal or the driving signal. The motor coil winding receives the driving signal and decides motor rotating direction according to the driving signal.

13 Claims, 3 Drawing Sheets

MOTOR CONTROL CIRCUIT FOR FORWARD/REVERSE ROTATION

FIELD OF THE INVENTION

The present invention is relating to a motor control circuit for forward/reverse rotation, and more particularly to a motor control circuit that switches its forward/reverse rotation with a single-signal source.

BACKGROUND OF THE INVENTION

Mostly, double-signal source method is adopted in practice for the known motor forward/reverse rotation control, however, this method in dealing with the circuit generally has some problems, for example, minute and complicated process, slow reacting speed, larger power consumption, as well as limited function expansions provided from the circuit, etc.

SUMMARY

The primary object of the present invention is to provide a motor control circuit for forward/reverse rotation, which applies a single-signal source to control fan motor forward/reverse rotation. It mainly includes a driving circuit for generating a control signal and a driving signal, a switching circuit for changing the transmitting direction of the control signal or the driving signal, and a motor coil winding for receiving the driving signal and deciding motor rotating direction according to the driving signal.

The secondary object of the present invention is to provide a motor control circuit for forward/reverse rotation. The driving circuit further includes a first diode, a first resistor, a first capacitor, a second capacitor and a third capacitor. The first diode is connected with the first resistor and the first capacitor, the first capacitor and the third capacitor are connected with the driving IC.

The third object of the present invention is to provide a motor control circuit for forward/reverse rotation. The switching circuit includes a contact, a first transistor, a second transistor, a third transistor, a fourth transistor, a fifth transistor, a second resistor, a third resistor, a fourth resistor, a fifth resistor, a sixth resistor and a seventh resistor.

The motor control circuit for forward/reverse rotation according to the present invention comprises a driving circuit, a switching circuit and a motor coil winding. The driving circuit has a driving source, a Hall IC and a driving IC. The driving source provides a signal to the Hall IC for enabling the Hall IC output a control signal to the driving IC, then the driving IC generates a driving signal. The switching circuit is utilized to change the transmitting direction of the control signal or the driving signal. The motor coil winding may receive the driving signal and decide motor rotating direction according to the driving signal.

DETAILED DESCRIPTION OF THE PRESENT INVENTION

Figure 1:
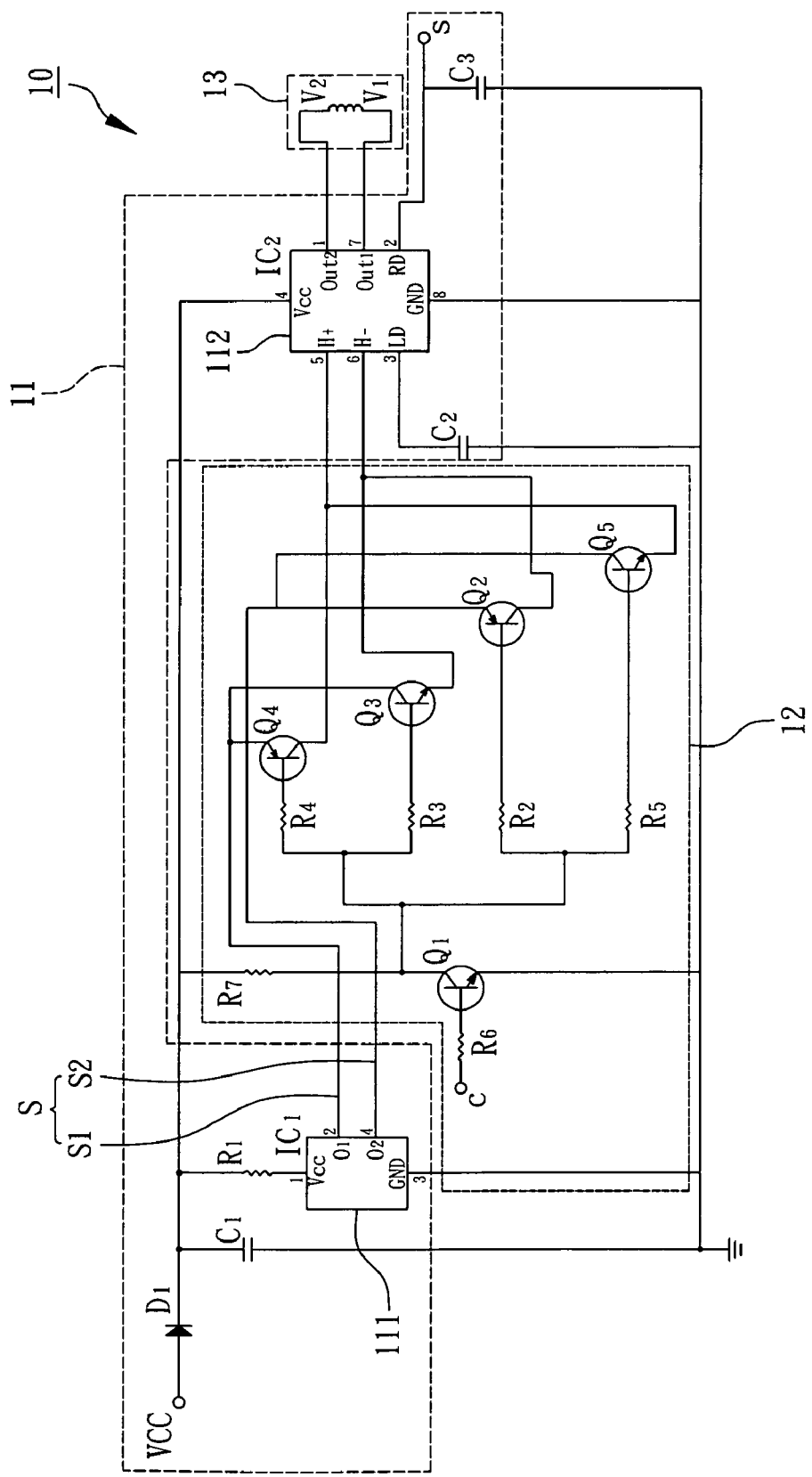
FIG. 1 shows a motor control circuit for forward/reverse rotation in accordance with the first preferred embodiment of the present invention.

According to the first preferred embodiment and referring to FIG. 1, a motor control circuit for forward/reverse rotation 10 comprises a driving circuit 11, a switching circuit 12 and a motor coil winding 13. The driving circuit 11 comprises a driving source VCC, a Hall IC 111, a driving IC 112, a first diode D1, a first resistor R1, a first capacitor C1, a second capacitor C2 and a third capacitor C3. The anode of the first diode D1 is connected with the driving source VCC and the cathode of the first diode D1 is connected with the Vcc pin of the driving IC 112, the first resistor R1 and the first capacitor C1. The second capacitor C2 and the third capacitor C3 are connected with the LD pin and the RD pin of the driving IC 112 respectively. In this embodiment, the driving source VCC is a DC voltage source and the Hall IC 111 is a four-pin IC, after a signal from the driving source VCC is supplied to the Vcc pin of the Hall IC 111, the Hall IC 111 outputs a control signal S that includes a first signal S1 and a second signal S2. Besides, the LD pin of the driving IC 112 can be connected with an auto restart circuit to automatically restart a fan motor in a while after removing a foreign body away as the fan is locked to stop rotating because of invasion of the foreign body. In addition, the RD pin of the driving IC 112 also can be connected with an alarm circuit to detect if the fan rotates normally.

The switching circuit 22 comprises a contact c, a first transistor Q1, a second transistor Q2, a third transistor Q3, a fourth transistor Q4, a fifth transistor Q5, a second resistor R2, a third resistor R3, a fourth resistor R4, a fifth resistor R5, a sixth resistor R6 and a seventh resistor R7. The sixth resistor R6 is located between the contact c and the base of the first transistor Q1, the second resistor R2 is connected with the collector of the first transistor Q1 and the base of the second transistor Q2, the third resistor R3 is connected with the collector of the first transistor Q1 and the base of the third transistor Q3, the fourth resistor R4 is connected with the collector of the first transistor Q1 and the base of the fourth transistor Q4, the fifth resistor R5 is connected with the collector of the first transistor Q1 and the base of the fifth transistor Q5, and the seventh resistor R7 is connected with the collector of the first transistor Q1. In this embodiment, the switching circuit 12 is located between the Hall IC 111 and the driving IC 112 of the driving circuit 11. The pin O1 of the Hall IC 111 of the driving circuit 11 is connected with the emitter of the fourth transistor Q4 and the collector of the third transistor Q3, the pin O2 of the Hall IC 111 of the driving circuit 11 is connected with the emitter of the second transistor Q2 and the collector of the fifth transistor Q5. Moreover, the H+ pin of the driving IC 112 of the driving circuit 11 is connected with the collector of the fourth transistor Q4 and the emitter of the fifth transistor Q5, the H− pin of the driving IC 112 of the driving circuit 11 is connected with the collector of the second transistor Q2 and the emitter of the third transistor Q3. The motor coil winding 13 has a first end V1 and a second end V2 that are connected with the Out1 pin and the Out2 pin respectively of the driving IC 112 of the driving circuit 11.

Next, the movements about the motor control circuit for forward/reverse rotation will be described as follows.

When the contact c of the switching circuit 12 is idle, the first transistor Q1 should be OFF state, so that the third transistor Q3 and the fifth transistor Q5 are turned in ON state. In the meantime, the first signal S1 of the control signal S passes through the third transistor Q3 to input to H− pin of the driving IC 112, the second signal S2 of the control signal S passes through the fifth transistor Q5 to input to H+ pin of the driving IC 112. Therefore, the first signal S1 and the second signal S2 enable the driving IC 112 to generate a driving signal that is received by the motor coil winding 13, then the motor coil winding 13 maintains the motor in a constant rotating direction (defined as clockwise) according to the driving signal. On the contrary, when the contact c of the switching circuit 12 is connected with the driving source VCC, the first transistor Q1 should be ON state that enables the second transistor Q2 and the fourth transistor Q4 to be turned in ON state. In the meantime, the first signal S1 of the control signal S passes through the fourth transistor Q4 to input to H+ pin of the driving IC 112, the second signal S2 of the control signal S passes through the second transistor Q2 to input to H– pin of the driving IC 112. Because the transmitting directions that the first signal S1 and the second signal S2 are input to the driving IC 112 are changed, the driving IC 112 generates another driving signal to drive the motor coil winding 13 and change motor rotating direction (defined as counterclockwise).

Figure 2:
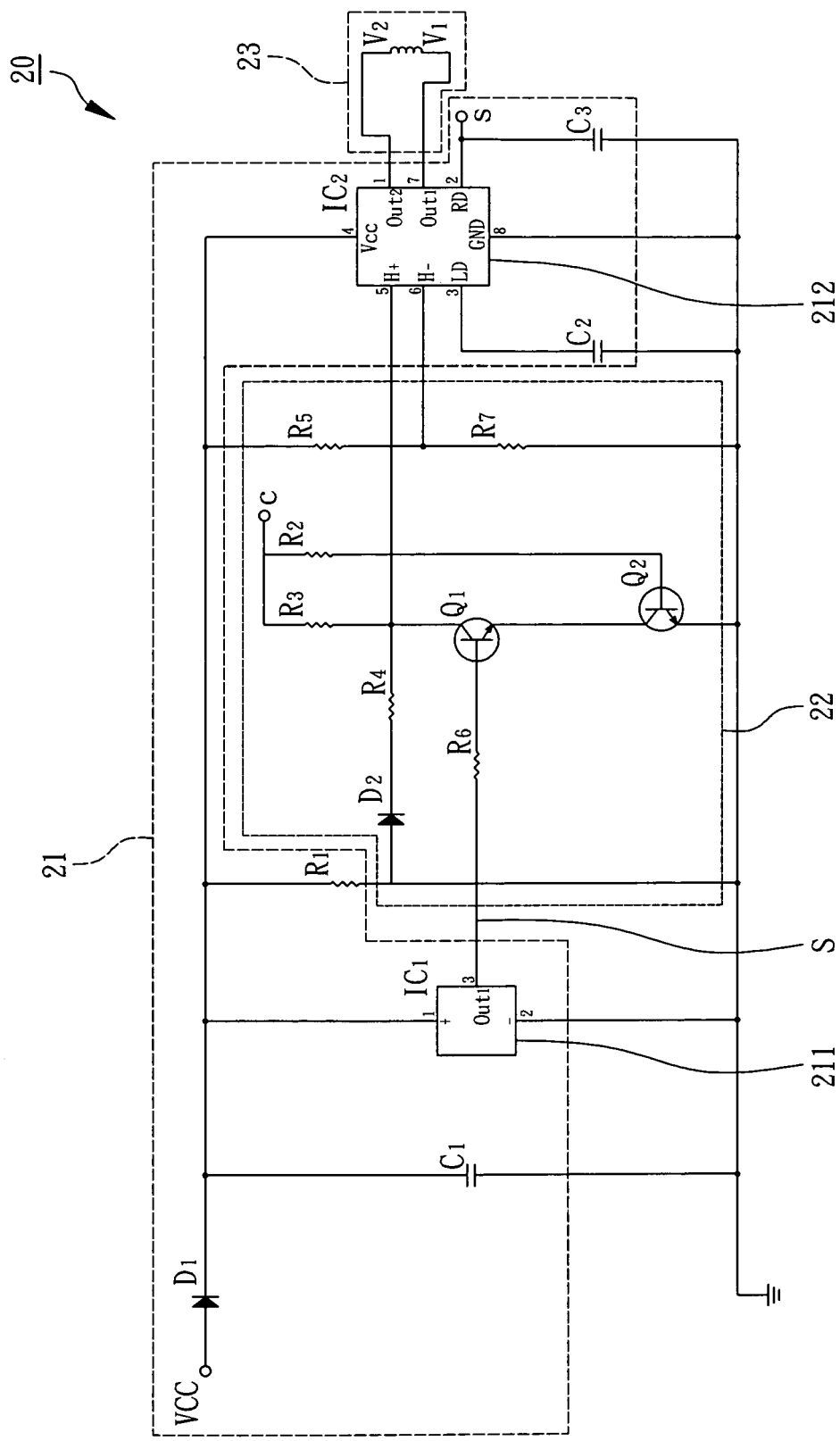
FIG. 2 shows a motor control circuit for forward/reverse rotation in accordance with the second preferred embodiment of the present invention.

According to the second preferred embodiment of the present invention and referring to FIG. 2, a motor control circuit for forward/reverse rotation 20 comprises a driving circuit 21, a switching circuit 22 and a motor coil winding 23. Basically the circuit composition in between this embodiment and the first preferred embodiment is almost same except that the third transistor Q3, the fourth transistor Q4 and the fifth transistor Q5 in the switching circuit 12 of the first embodiment are replaced by a second diode D2 in the switch circuit 22 of this embodiment, accordingly the composition of the switching circuit 22 of this embodiment includes a contact c, a first transistor Q1, a second transistor Q2, a second diode D2, a second resistor R2, a third resistor R3, a fourth resistor R4, a fifth resistor R5, a sixth resistor R6 and a seventh resistor R7. The second resistor R2 is connected with the contact c and the base of the second transistor Q2, the third resistor R3 is connected with the contact c and the collector of the first transistor Q1, the fourth resistor R4 is connected with the collector of the first transistor Q1 and the cathode of the second diode D2, the fifth resistor R5 is connected with the seventh resistor R7, and the sixth resistor R6 is connected with the base of the first transistor Q1. The emitter of the first transistor Q1 is further connected with the collector of the second transistor Q2. In this embodiment, the first resistor R1 of the driving circuit 21 is located between the first diode D1 and the second diode D2, the H+ pin of the driving IC 212 is connected with the third resistor R3, the fourth resistor R4 and the collector of the first transistor Q1, and the H– pin of the driving IC 212 is connected with the fifth resistor R5 and the seventh resistor R7. The Hall IC 211 adopts a three-pin IC.

Figure 3:
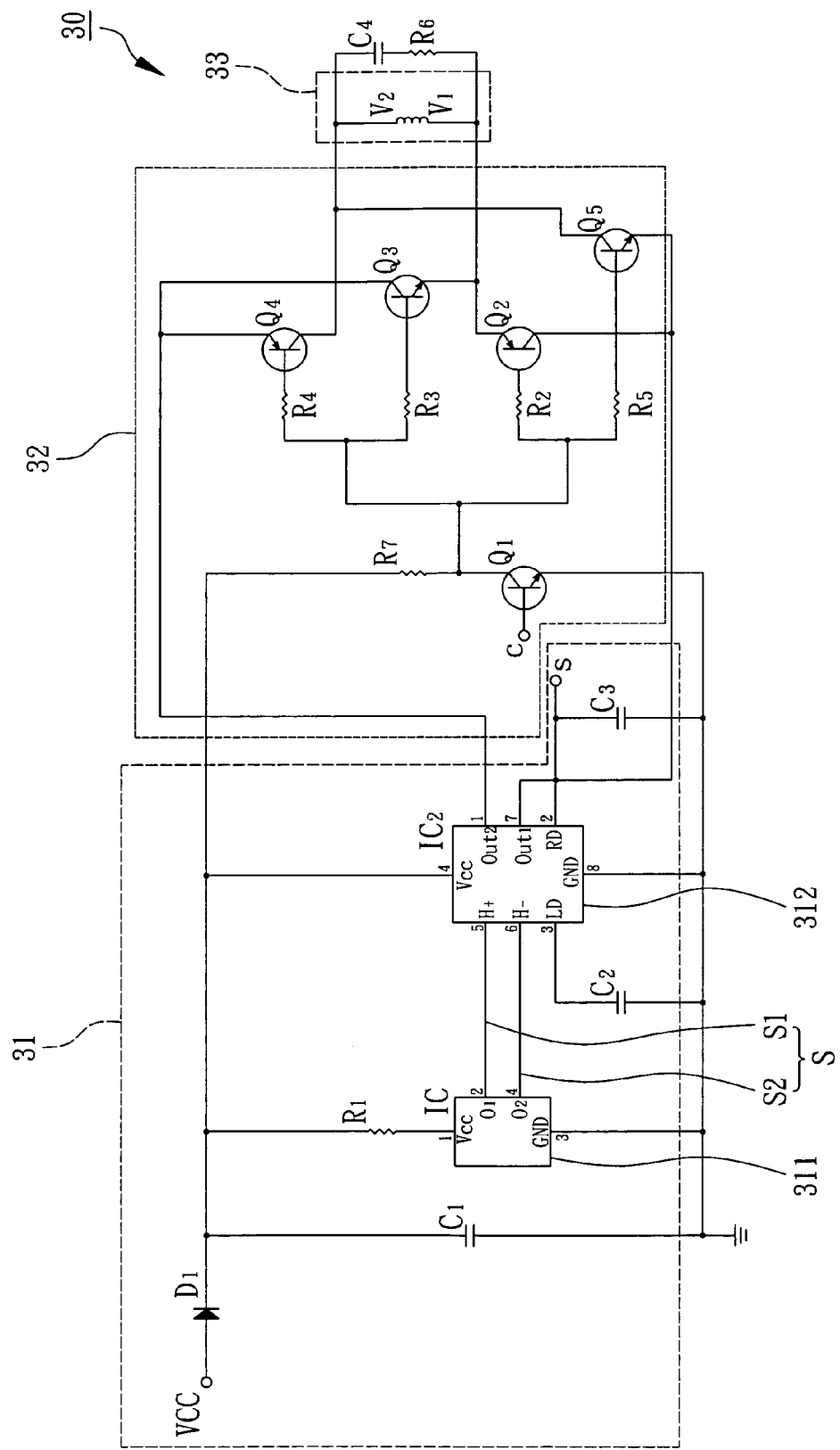
FIG. 3 shows a motor control circuit for forward/reverse rotation in accordance with the third preferred embodiment of the present invention.

Referring to FIG. 3, a motor control circuit for forward/reverse rotation 30 according to the third preferred embodiment of the present invention includes a driving circuit 31, a switching circuit 32 and a motor coil winding 33. Basically the circuit composition in between this embodiment and the first preferred embodiment is also almost same except that the switching circuit 32 in this embodiment is connected with the driving circuit 31 and the motor coil winding 33, thereby the emitter of the second transistor Q2 and the emitter of the third transistor Q3 of the switching circuit 32 are connected with the first end V1 of the motor coil winding 33, and the collector of the fourth transistor Q4 and the collector of the fifth transistor Q5 of the switching circuit 32 are connected with the second end V2 of the motor coil winding 33. In this embodiment, the driving IC 312 of the driving circuit 31 is connected with the Hall IC 311 and the switching circuit 32. Accordingly, the control signal S output from the Hall IC 311 is transmitted to the driving IC 312 to inform the driving IC 312 generating a driving signal, the switching circuit 32 (same movements with the switching circuit 12 in the first preferred embodiment) receives the driving signal and changes the transmitting direction of the driving signal that allows the motor coil winding 33 to decide motor rotating direction according to the driving signal.

While the present invention has been particularly illustrated and described in detail with respect to the preferred embodiments thereof, it will be clearly understood by those skilled in the art that various changed in form and details may be made without departing from the spirit and scope of the present invention.

What is claimed is:

1. A motor control circuit for forward/reverse rotation comprising:
   a driving circuit including a driving source, a Hall IC and a driving IC, wherein the driving source provides a signal to enable the Hall IC to output a control signal to the driving IC;
   a switching circuit located between the Hall IC and the driving IC, wherein the switching circuit is utilized to change the transmitting direction of the control signal, the driving IC generates a driving signal according to the transmitting direction of the control signal; and
   a motor coil winding for receiving the driving signal and deciding motor rotating direction according to the driving signal.

2. The motor control circuit for forward/reverse rotation in accordance with claim 1, wherein the driving source is a DC voltage source.

3. The motor control circuit for forward/reverse rotation in accordance with claim 1, wherein the Hall IC is a three-pin IC or four-pin IC.

4. The motor control circuit for forward/reverse rotation in accordance with claim 1, wherein the driving circuit further includes a first diode, a first resistor, a first capacitor, a second capacitor and a third capacitor, the first diode is connected with the first resistor and the first capacitor, the second capacitor and the third capacitor are connected with the driving IC.

5. The motor control circuit for forward/reverse rotation in accordance with claim 4, wherein the first diode is connected with the driving source and the driving IC.

6. The motor control circuit for forward/reverse rotation in accordance with claim 1, wherein the switching circuit includes a contact, a first transistor, a second transistor, a third transistor, a fourth transistor, a fifth transistor, a second resistor, a third resistor, a fourth resistor, a fifth resistor, a sixth resistor and a seventh resistor, the sixth resistor is located between the contact and the first transistor, the second resistor is connected with the first transistor and the second transistor, the third resistor is connected with the first transistor and the third transistor, the fourth resistor is connected with the first transistor and the fourth transistor, the fifth resistor is connected with the first transistor and the fifth transistor, and the seventh resistor is connected with the first transistor.

7. The motor control circuit for forward/reverse rotation in accordance with claim 1, wherein the switching circuit includes a contact, a first transistor, a second transistor, a second diode, a second resistor, a third resistor, a fourth resistor, a fifth resistor, a sixth resistor and a seven resistor, the second resistor is connected with the contact and the second transistor, the third resistor is connected with the contact and the first transistor, the fourth resistor is connected with the first transistor and the second diode, the fifth resistor is connected with the seventh resistor, and the sixth resistor is connected with the first transistor.

8. A motor control circuit for forward/reverse rotation comprising:
   a driving circuit including a driving source, a Hall IC and a driving IC, wherein the driving source provides a signal to enable the Hall IC to output a control signal to the driving IC, the driving IC generates a driving signal according to the control signal;
   a switching circuit connected with the driving IC, wherein the switching circuit receives the driving signal and changes the transmitting direction of the driving signal; and
   a motor coil winding connected with the switching circuit, wherein the motor coil winding decides motor rotating direction according to the transmitting direction of the driving signal.

9. The motor control circuit for forward/reverse rotation in accordance with claim 8, wherein the driving source is a DC voltage source.

10. The motor control circuit for forward/reverse rotation in accordance with claim 8, wherein the Hall IC is a four-pin IC.

11. The motor control circuit for forward/reverse rotation in accordance with claim 8, wherein the driving circuit further includes a first diode, a first resistor, a first capacitor, a second capacitor and a third capacitor, the first diode is connected with the first resistor and the first capacitor, and the second capacitor and the third capacitor are connected with the driving IC.

12. The motor control circuit for forward/reverse rotation in accordance with claim 11, wherein the first diode is connected with the driving source and the driving IC.

13. The motor control circuit for forward/reverse rotation in accordance with claim 8, wherein the switching circuit includes a contact, a first transistor, a second transistor, a third transistor, a fourth transistor, a fifth transistor, a second resistor, a third resistor, a fourth resistor, a fifth resistor, a sixth resistor and a seventh resistor, the contact is connected with the first transistor, the second resistor is connected with the first transistor and the second transistor, the third resistor is connected with the first transistor and the third transistor, the fourth resistor is connected with the first transistor and the fourth transistor, the fifth resistor is connected with the first transistor and the fifth transistor, and the seventh resistor is connected with the first transistor.

* * * * *